United States Patent
Jadhav et al.

(10) Patent No.: US 12,521,791 B2
(45) Date of Patent: Jan. 13, 2026

(54) SURFACE-MODIFIED METAL OR METAL ALLOY POWDER AND METHOD OF PRODUCING THE SAME

(71) Applicant: KATHOLIEKE UNIVERSITEIT LEUVEN, Leuven (BE)

(72) Inventors: Suraj Dinkar Jadhav, Leuven (BE); Kim Vanmeensel, Bekkevoort (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 428 days.

(21) Appl. No.: 17/760,387

(22) PCT Filed: Feb. 10, 2021

(86) PCT No.: PCT/EP2021/053229
§ 371 (c)(1),
(2) Date: Aug. 9, 2022

(87) PCT Pub. No.: WO2021/160684
PCT Pub. Date: Aug. 19, 2021

(65) Prior Publication Data
US 2023/0065030 A1    Mar. 2, 2023

(30) Foreign Application Priority Data
Feb. 11, 2020   (EP) ................................ 20156537

(51) Int. Cl.
*B22F 1/17*     (2022.01)
*B22F 1/05*     (2022.01)
*B33Y 70/00*    (2020.01)

(52) U.S. Cl.
CPC .............. *B22F 1/17* (2022.01); *B22F 1/05* (2022.01); *B33Y 70/00* (2014.12);
(Continued)

(58) Field of Classification Search
None
See application file for complete search history.

(56) References Cited

U.S. PATENT DOCUMENTS

2019/0240729 A1    8/2019    Furusawa et al.

FOREIGN PATENT DOCUMENTS

| CN | 107983956 A | 5/2018 |
|---|---|---|
| CN | 108580918 A | 9/2018 |

(Continued)

OTHER PUBLICATIONS

Database WPI, "Clarivate Analytics", Week 201871, Thomson Scientific, May 21, 2018.
(Continued)

*Primary Examiner* — Daniel J. Schleis
(74) *Attorney, Agent, or Firm* — Workman Nydegger

(57) ABSTRACT

A method of surface modification of a metal or metal alloy powder includes the steps of providing a metal or metal alloy powder including copper, gold, or silver and having an average diameter in the micron range; providing a powder having an alloying element to form an alloying element powder. The alloying element powder particles have an average diameter less than 10 micron and no more than half the average diameter of the metal or metal alloy powder particles; mixing the powders to form a mixed powder; heating the mixed powder in an atmosphere of reducing gas to a first temperature T1; after temperature T1 is reached, replacing the reducing gas atmosphere with an inert gas atmosphere and maintaining the temperature at a second temperature T2 for a predetermined time. The alloying element is capable of diffusing in the metal or metal alloy element at temperature T2.

10 Claims, 14 Drawing Sheets

(52) U.S. Cl.
CPC ....... *B22F 2201/01* (2013.01); *B22F 2201/11* (2013.01); *B22F 2302/25* (2013.01); *B22F 2304/10* (2013.01); *B22F 2998/10* (2013.01)

(56) References Cited

FOREIGN PATENT DOCUMENTS

| | | | |
|---|---|---|---|
| CN | 109746435 A | | 5/2019 |
| DE | 112017004921 T5 | | 6/2019 |
| GB | 821728 A | | 10/1959 |
| JP | H08-92604 | * | 4/1996 |
| JP | H0892604 A | | 4/1996 |

OTHER PUBLICATIONS

Extended European Search Report from corresponding European Application No. 20156537.1, Aug. 26, 2020.
International Search Report from PCT Application No. PCT/EP2021/053229, May 4, 2021.

* cited by examiner

SURFACE-MODIFIED METAL OR METAL ALLOY POWDER AND METHOD OF PRODUCING THE SAME

FIELD OF THE INVENTION

The present invention is generally related to methods of producing a surface-modified metal or metal alloy powder, and surface-modified metal or metal alloy powders produced by such methods.

BACKGROUND OF THE INVENTION

In laser-based additive manufacturing methods in which laser energy is used to melt and fuse together particles of a metallic powder, the reflectivity of the powder used has an impact in several areas. A high reflectivity results in a higher laser power required to achieve melting, as less energy is absorbed by the powder. This means that lasers with a high power output are required, increasing the energy requirements. In addition, back-reflected laser light can be coupled back into the optical system and cause damage to optical components.

In many applications it is desirable that a metal or metal alloy powder to be used in laser additive manufacturing also includes a proportion of an alloying element. This can serve a variety of purposes. For example, the paper "*Effect of heat treatments on microstructure and properties of CuCrZr produced by laser-powder bed fusion*" (Wallis et al., Materials Science & Engineering A, 2018) describes a copper-chromium-zirconium alloy which has improved powder optical absorption in the infrared region of the spectrum as compared to copper powder alone.

Moreover, in a fabricated part, the presence of certain alloys or alloying elements in an alloy can help to increase mechanical strength, fatigue, creep, and corrosion resistance. An alloy element can be introduced to a metal powder by modification of the surface of the metal powder particles so as to produce a layer or coating of a mixture of the metal and the alloy element. Currently, methods for such surface modification fall into two categories.

A first category is the coating of reflective powders with a non-reflective metal by electrolysis or electroplating. In some cases the metal powder particles need to be in contact with water. In other cases electroplating of aluminium and refractory metals occurs from non-aqueous solvents. In general, a disadvantage of electrolysis and electroplating coating methods is that the powder needs to be submerged into a solvent and needs to be dried afterwards. Avoiding any contact with air during these processing steps, hence avoiding any oxidation is challenging and costly.

A second category is coating of metal powder particles by Chemical Vapour Deposition (CVD) or Physical Vapour Deposition (PVD). These methods are applicable with a wider range of materials for the coating; however, they are very difficult to upscale to an industrial level and can be very costly. In "*Mechanical and electrical properties of selective laser-melted parts produced from surface-oxidized copper powder*" (S. Jadhav et al., Mat Design Process Comm, 2019) a method is described of modifying the surface of a pure copper powder by oxidation to enhance the optical absorption of the powder. The pure copper powder was heated in a horizontal furnace at 200° C. for 2 hours in the air to form a surface oxide layer. The oxidized copper powder shows a higher optical absorption of 58% at 1080 nm compared with the lower optical absorption of 32% for the virgin copper powder. Although the oxidation of copper powder can cause an increase in the powder optical absorption, the presence of oxygen in a final part manufactured using such a powder is undesired due to the detrimental effect of oxygen on corrosion resistance, mechanical strength (mainly for Cu alloys), electrical and thermal conductivity. Accordingly, electrical and thermal management devices are preferably fabricated from oxygen-free copper and copper-alloys.

'*The effect of powder oxidation on defect formation in laser additive manufacturing*' (C. Leung et al., Acta Materialia, 2018) demonstrates that oxides present in a powder during laser additive manufacture nucleate and stabilize pore formation. This suggests that oxides are also detrimental for the stability of laser additive manufacturing processes.

Pre-alloying of reflective metals such as copper, gold, and silver with low amount of alloying element (<2 wt. %) during powder production (e.g. gas atomization) tends to cause distribution of the alloying element randomly within the metal powder particles, meaning that laser reflectivity is not substantially reduced. However, if the alloying element is present on the surface of metal powder particles, then the laser reflectivity of metal powder particles can substantially be reduced, provided that the alloying element exhibits low laser reflectivity and the thickness of the applied layer is greater than the theoretical penetration depth of laser light (generally about 20 nm for most of the metals) inside the alloy element.

Current methods such as electroplating, CVD, PVD, and so on, providing metal or metal alloy powders which are modified with an alloy element are only applicable to a restricted set of metals as the alloying elements.

In JPH0892604 a production method is described for an iron-based copper containing composite powder for powder metallurgy. Fine copper oxide is mixed with the iron powder which has not been finish-reduced or annealed so that the metal content is controlled to 10-50 wt. %. The mixture is reduced in a reducing atmosphere at 700-950° C. to diffuse and deposit metallic copper on the iron powder surface. An iron-based copper containing composite powder for powder metallurgy is so obtained. When the iron powder is reduced with copper oxide, carbon is preferably added by 0.15-5.0%.

Patent document GB821728 discloses a powder based on a metal from the group iron, nickel, cobalt, molybdenum, tungsten, and alloys of at least two of those metals, being chromized by heating in a reducing or neutral atmosphere an intimate mixture of the powder with a powder consisting at least partly of chromium and evolving vapours of a chromium halide in the mixture. None of these metals is optically reflective in the infrared regime of the electromagnetic spectrum.

Therefore there is still a need for simple, easily implementable methods of surface modification of metal or metal alloy powders which can be used for a wide range of alloying elements.

SUMMARY OF THE INVENTION

It is an object of embodiments of the present invention to provide for a method of surface modification of a metal or metal alloy powder wherein a wide range of alloying elements can be used. It is also an object to provide for a method of surface modification of a metal or metal alloy powder wherein the introduction of oxides is limited. It is a further object for a method of surface modification of a metal or metal alloy powder wherein the reflectivity of the resulting surface is reduced compared to before the treatment.

The above objective is accomplished by the solution according to the present invention.

In a first aspect the invention relates to a method of surface modification of a metal or metal alloy powder comprising the steps of:
i) providing a metal or metal alloy powder, the metal or metal alloy powder particles comprising copper, gold, or silver and having an average diameter in the micrometer range;
ii) providing a powder comprising an alloying element to form an alloying element powder, the alloying element powder particles having an average diameter being less than 10 micrometer and no more than half the average diameter of the metal or metal alloy powder particles;
iii) mixing the metal or metal alloy powder and the alloy powder to form a mixed powder;
iv) heating the mixed powder in an atmosphere of reducing gas to a predetermined first temperature T1, said reducing gas being an oxidation preventing gas;
v) after temperature T1 is reached, replacing the reducing gas atmosphere with an inert gas atmosphere and maintaining the temperature at a second temperature T2 for a predetermined time, said second temperature T2 being at least equal to temperature T1,
wherein the alloying element is capable of diffusing in the metal or metal alloy element at the second temperature T2.

It is an advantage of embodiments of the present invention that a surface-modified powder can be produced in a simple manner which is easily up-scalable.

It is an advantage of embodiments of the present invention that a metal or metal alloy powder having a high reflectivity can be easily modified to produce a powder having a lower reflectivity.

It is an advantage of embodiments of the present invention that a surface-modified powder can be produced without the need for specific chemicals which depend on the metal or alloy used.

It is an advantage of embodiments of the present invention that the reflectivity of a highly reflective metal powder such as copper, gold, or silver can be reduced by a simple and cheap surface modification.

The reducing gas may comprise carbon or hydrogen in some embodiments.

In one embodiment the method may comprise, before step (iv), placing the mixed powder in an atmosphere of argon.

It is an advantage of embodiments of the present invention that oxygen pickup during mixing or storage of the mixed powder can be reduced, when the powder mixing and storage is done in an inert atmosphere. This helps to minimise the required duration of the reduction step.

Advantageously, the method may comprise, after step (v), a separation step comprising mixing the surface-modified powder in a turbula mixer.

The predetermined second temperature T2 may be chosen depending on diffusion characteristics of the alloying element in the metal or metal alloy.

In one embodiment the second temperature T2 may be chosen so as to result in a diffusion depth of the alloy element in the metal or metal alloy of no more than 5000 nm.

In another embodiment the predetermined second temperature T2 may be less than 90% of the melting point of the metal or metal alloy.

In some embodiments the alloying element of the alloy element powder and the alloying element of the metal alloy powder, if present, may comprise less than 5 weight % of the mixed powder.

In embodiments of the invention the predetermined second temperature may be chosen so as to achieve an average surface-modified layer thickness of less than 50 nm.

In one embodiment the predetermined second temperature T2 may be chosen so as to achieve an average surface-modified layer thickness which is greater than the penetration depth of light in the surface-modified powder at a predetermined wavelength.

According to a second aspect of the present invention there is provided a surface-modified metal or metal alloy powder obtained by a method as described above.

In one embodiment the surface-modified metal or metal alloy powder may have an average surface-modified layer thickness of less than 50 nm.

The surface-modified metal or metal alloy powder may have an average surface-modified layer thickness which is greater than the penetration depth of light at a predetermined wavelength.

According to a third aspect of the present invention there is provided the use of a surface-modified metal or metal alloy powder as obtained by the disclosed method in a laser-based additive manufacturing process.

A laser-based additive manufacturing process can be, for example, laser powder bed fusion or directed energy deposition.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
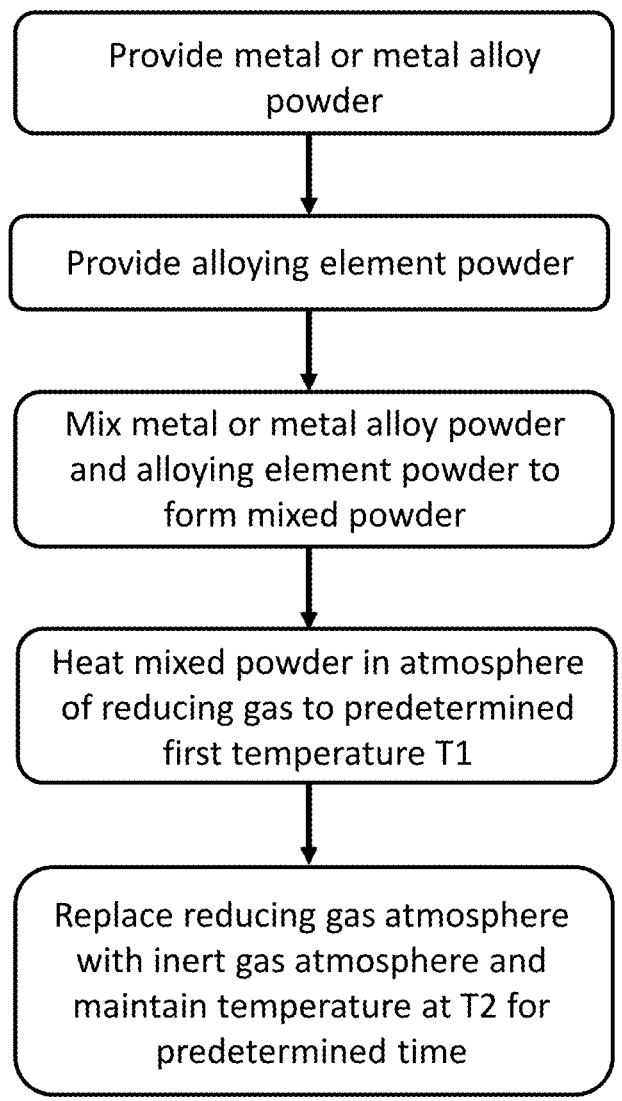
FIG. 1 illustrates a flow chart of a method according to embodiments of the present invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The methods proposed in the present invention are mainly concerned with modifying the surface of a metal powder or metal alloy powder in order to reduce the reflectivity. The metal or metal alloy powder then absorbs more energy and the requirements for e.g. the applied lasers can be mitigated.

Figure 2:
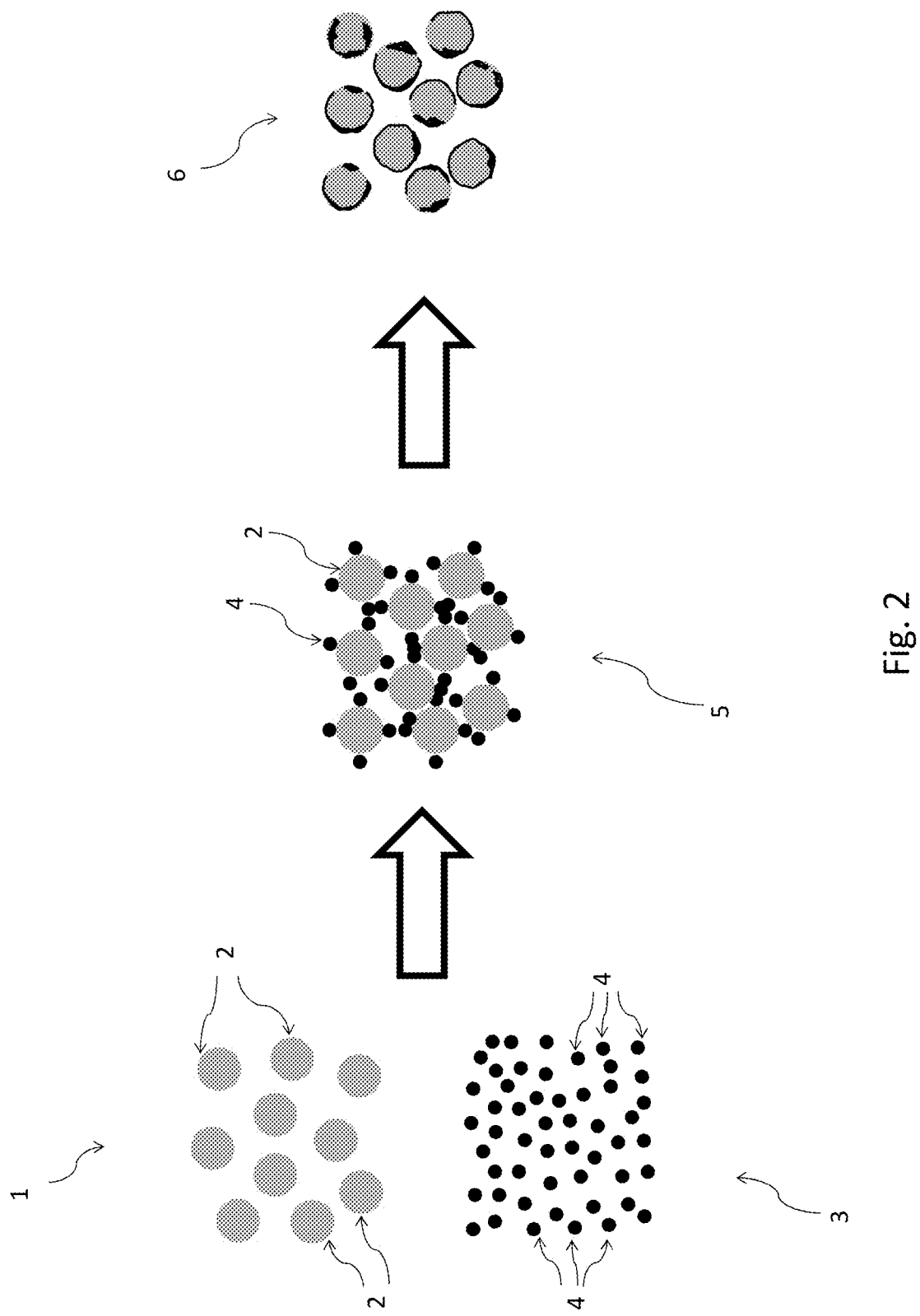
FIG. 2 illustrates (not to scale) powders at various stages of a method according to embodiments of the present invention.

Referring to FIGS. 1 and 2, a method according to embodiments of the present invention comprises the following steps.

Step S1: A metal or metal alloy powder 1 is provided.

The metal or metal alloy powder 1 comprises metal or metal alloy powder particles 2 which have an average diameter in the micron range. The average diameter of the powder particles may be chosen in dependence upon the expected use of the powder. For example, for laser powder bed fusion applications, the average diameter is preferably between 15 and 60 μm. For directed energy deposition applications, the average diameter is preferably between 10 and 200 more preferably between 50 and 150 μm. For other laser-based processes, the preferable average diameter range may be different.

A metal or metal alloy powder with an average diameter within a specified range can be obtained by, for example, sieving a powder comprising particles with a larger range of average diameters than the required range. The particle size distribution can be measured, for example, using a particle size analyser such as a laser diffraction particle size analyser.

In the case of a metal alloy powder, the powder may have been pre-alloyed with a metal powder alloy element. For example, the metal alloy powder may be a pre-alloyed copper-silicon, copper-zirconium, or copper-chromium powder. The pre-alloy element may also be referred to as a pre-alloy alloy. The metal alloy powder may be a pre-alloyed gold powder, for example gold-zinc, gold-cadmium, gold-nickel, gold-cobalt. The metal alloy powder may be a pre-alloyed silver powder, for example silver-tin, silver-copper-nickel. Other pre-alloyed metal powders may be used. Preferably, the pre-alloy alloy content is less than 2 wt. % of the metal alloy powder. The metal powder alloy element is preferably provided throughout the metal alloy powder particle, that is, not as a coating on a base metal powder.

Step S2: A powder comprising an alloying element is provided to form an alloying element powder 3.

The alloying element powder 3 comprises alloying element powder particles 4 which have an average particle diameter of less than 10 µm, preferably of less than 1 µm, i.e. preferably sub-micron. The alloying element powder preferably has an average particle size which is less than half the average particle size of the metal or metal alloy powder.

The alloying element is an element capable of diffusion in the metal or metal alloy element at the second temperature T2, which will be described in more detail hereinafter.

The alloying element is an element which is capable of forming an alloy with the metal or metal alloy. The alloying element generally tends to strengthen the matrix formed by the metal and the alloy element in the surface modified powder as compared to the metal alone. In some cases the alloy element can also improve malleability or workability of the part manufactured using the surface modified powder as compared to a part manufactured using the metal or metal alloy powder. For example, for most uses of gold and especially in jewellery, the pure metal alone is too soft; it can be hardened by addition of, for example, copper, silver, nickel, palladium, zinc. Alloying elements can be added to change the colour of gold.

The amount of alloying element provided in step S2 is preferably such that the total alloy content of the mixed powder (step S3), including the alloy content of the pre-alloyed metal alloy powder (if used) and the alloy content of the alloy element powder, is less than 5 wt. %. Thus, if a metal powder and not a metal alloy powder is used, the alloy element powder preferably forms less than 5 wt. % of the mixed powder.

If a metal alloy powder is used, the contribution of the pre-alloy element to the alloy content of the mixed powder is preferably less than 2 wt. %. The contribution of the alloy element powder to the alloy content of the mixed powder is then maximally 5 wt. % minus the contribution of the pre-alloy element. For example, the pre-alloy element may contribute 2 wt. % and the alloy element may contribute 3 wt. %.

Step S3: The metal or metal alloy powder and the alloying element powder are mixed to form a mixed powder 5.

The mixing step serves to uniformly or near-uniformly distribute the alloy element powder particles 4 on the surface of the metal or metal alloy powder particles 2 so as to obtain an essentially uniform or near-uniform coating. This may aid the diffusion process in step S5.

The mixing preferably takes place in a three-dimensional shaker-mixer such as a Turbula multi-directional, low-energy mixer. The mixing preferably takes place in an atmosphere of argon to reduce potential oxygen pickup. This can help to avoid an increase in the required reduction time.

The mixed powder may be stored between step S3 and S4 in an argon atmosphere to reduce oxygen pickup.

Step S4: The mixed powder is heated in an atmosphere of reducing gas to a predetermined first temperature T1.

The predetermined first temperature T1 is chosen so as to be sufficient to reduce any surface-oxides present on the metal or metal alloy powder 1 and the alloy element powder 3, so as to obtain a mixed powder comprising essentially surface-oxide-free metal powder or metal alloy powder and alloy element powder.

The reducing gas is any gas which prevents oxidization by removal of oxygen and other oxidizing gases. The reducing gas may be for example hydrogen, a carbonaceous gas (methane, carbon dioxide, etc.), or ammonia. The reducing gas may comprise a mixture of gases, for example an actively reducing element such as hydrogen in combination with an inert carrier gas such as argon.

The furnace is heated at a heating rate of between 1 and 50° C./min, preferably between 5 and 20° C./min, while providing the reducing gas. In case of a relatively high heating rate, for example a heating rate of greater than 20° C./min, the atmosphere may be held at first temperature T1 so as to allow for the reduction process to be completed. At a relatively low heating rate, for example a heating rate of less than 5° C./min, it can be expected that most of the oxides are removed once the first temperature T1 is reached, so maintaining the atmosphere at the first temperature before continuing to step S5 may not be required.

Step S5: the reducing gas atmosphere is replaced with an inert gas atmosphere and the temperature is maintained at a second temperature T2 for a predetermined time.

In some embodiments, the second temperature T2 is different to the first temperature T1. If T2 is different to T1, T2 is greater than the first temperature T1, and in such cases either the gas is replaced and the temperature is then increased from T1 to T2, or the gas replacement and temperature increase take place at the same time.

The second temperature T2 is chosen depending upon the diffusion kinetics of the alloying element of the alloying element powder 3 in the metal or metal alloy powder 1 and is generally between 100° C. to 1000° C. The holding time at the predetermined second temperature T2 is chosen so as to allow the inward diffusion of the alloying element in the alloying element powder into the metal or metal alloy powder particles 2. The holding time at the second temperature T2 is chosen so as to allow diffusion up to a maximum depth of 5000 nm inside the metal powder particles 2, preferably no more than 1000 nm, more preferably no more than 500 nm. The diffusion depth can be calculated using Fick's second law of diffusion. In some embodiments, the predetermined second temperature may be chosen so as to achieve an average surface-modified layer thickness of less than 50 nm. The surface-modified layer may not be uniform, hence, thickness at multiple locations may need to be measured and an average value of thickness can be reported along with the standard deviation. The thickness of the surface-modified layer can be measured for example by cutting a powder particle using a Focused Ion Beam and the thickness of the layer could be measured at a point where the concentration of the alloying element falls below a certain amount in wt. %.

In some embodiments, the predetermined second temperature may be chosen so as to achieve an average surface-modified layer thickness which is greater than a penetration depth of optical light in the surface-modified powder at a predetermined wavelength. The predetermined wavelength can be, for example, the wavelength of a laser which is to be incident on the surface-modified powder. The laser light wavelength preferably falls within the infrared range, e.g. a fibre laser or a $CO_2$ laser. For example, for a powder which is planned to be used in a laser-assisted additive manufacturing process, the predetermined wavelength may be chosen as the wavelength of the laser to be used. This may be, for example, in the range of 1060 nm to 1080 nm for an infrared fibre laser. The penetration of the laser light of known wavelength can be calculated using the Beer-Lambert law. The thickness of the diffusion layer can be determined e.g. by the methods already mentioned previously.

The required second temperature T2 can be chosen by applying a range of second temperatures and measuring the average surface-modified layer thickness and the penetration depth of light at the predetermined wavelength for the resulting powders, and choosing the second temperature as a temperature which results in an average surface-modified layer thickness which is greater than the penetration depth.

The thickness of the surface-modified layer can be measured, for example, by coating the powder particles with a 1 μm thick layer of platinum. Subsequently, a powder particle is cut using a focused Ga ion beam (FIB-SEM, Dual-beam, Nova 600 Nanolab, FEI), and the thickness can be measured based on the EDS elemental map of the surface-modified layer.

The second temperature T2 and the holding time are related, in that a longer holding time at a lower temperature can result in the same maximum diffusion depth as a shorter holding time at a higher temperature.

The second temperature T2 and the holding time can be determined experimentally, for example by testing a range of temperature-time combinations to find a preferable combination for producing a particular surface modified powder, such as a preferred diffusion depth or a preferred reflectivity or other physical property.

The predetermined second temperature T2 should not allow sintering of the metal powder particles 2 together and therefore should be less than 90% of the melting temperature of the metal or metal alloy in ° C., preferably less than 80% of the melting temperature of the metal or metal alloy in ° C., more preferably less than 70% of the melting temperature of the metal or metal alloy in ° C. In some embodiments, the first temperature T1 and the second temperature T2 may be equal.

Without wishing to be bound by theory, it is thought that maintaining the mixed powder at the second temperature T2 in an inert atmosphere facilitates inward diffusion of the alloying element into the surface of the metal or metal alloy particles so as to form a surface-modified layer comprising both the metal or metal alloy and the alloying element.

Although the term "layer" is used herein to refer to the "surface-modified layer", it will be understood that the layer need not be present over the entire surface of the surface-modified powder particles, that is, the surface-modified powder particles may have a surface that comprises regions of metal or metal alloy and regions of metal or metal alloy in combination with alloying element.

The function of the inert gas is to offer a protective atmosphere, that is, a non-oxidizing and non-reactive atmosphere. It is thought that this helps the diffusion of the alloy element into the metal or metal alloy powder particles. Examples of inert gases that can be used are helium and argon. Depending on the metal or metal alloy and alloying element involved, other gases may be used. For example, where the metal is pure copper and the alloy element is a non-nitrogen-reactive element such as nickel, nitrogen can be used as the inert gas. The inert gas may comprise a mixture of gases, for example a mixture of argon and a small amount, for example less than 10%, of a reactive gas such as hydrogen.

Example 1

Pure copper (99.95%, HCCu) powder with a mean particle size of 45±15 μm was used as the metal powder, obtained from Sandvik Osprey Ltd (United Kingdom). Pure Nickel powder with an average particle size of approximately 1 μm was used as the alloying element powder, obtained from Jingmen Gem Co Ltd. (China). The powders were dry-mixed in the proportion 99:1 Cu:Ni by weight in a Turbula T2F shaker mixer for 12 hours. During the mixing, the powders were kept inside a polyethylene bottle filled with argon gas to minimize the powder surface oxidation.

Figure 3:
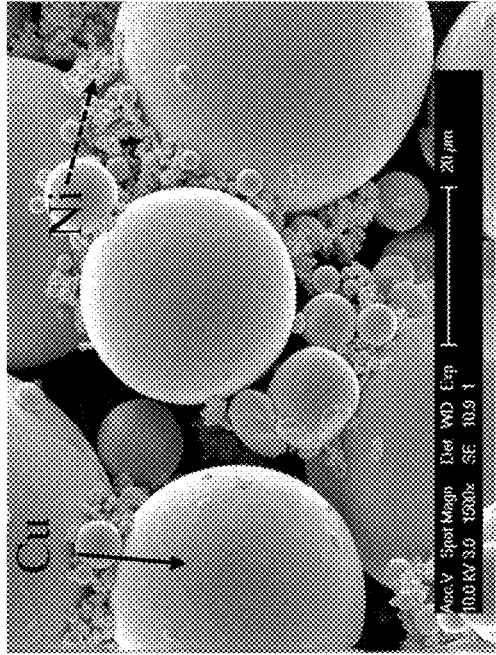
FIG. 3 illustrates scanning electron microscope (SEM) images of a mixed powder of copper and nickel.
Figure 3:
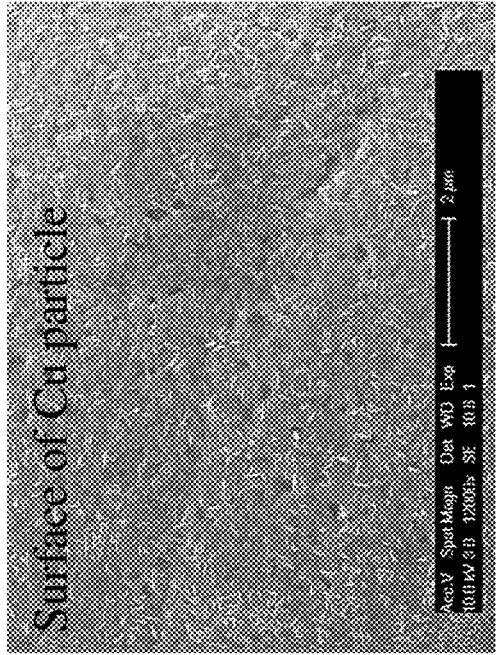
Figure 3:
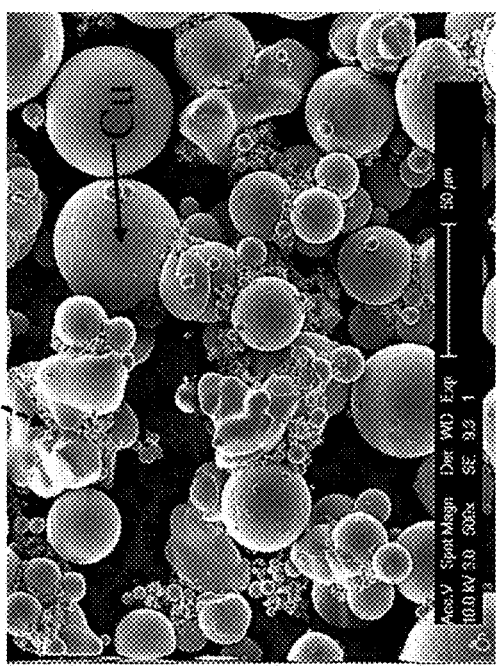
Figure 3:
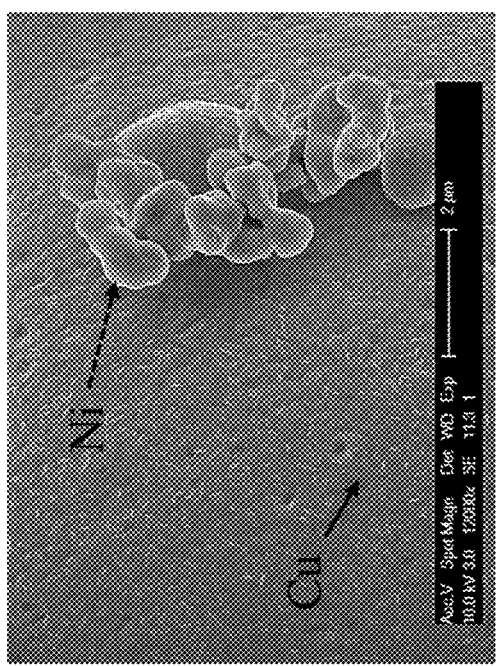

SEM images of the mixed powder are shown in FIG. 3. It can be seen that the copper powder particles, indicated by solid arrows, are coarser and more spherical in shape as compared to the nickel powder particles, indicated by dashed arrows, which are smaller and more irregular in shape.

Figure 4A:
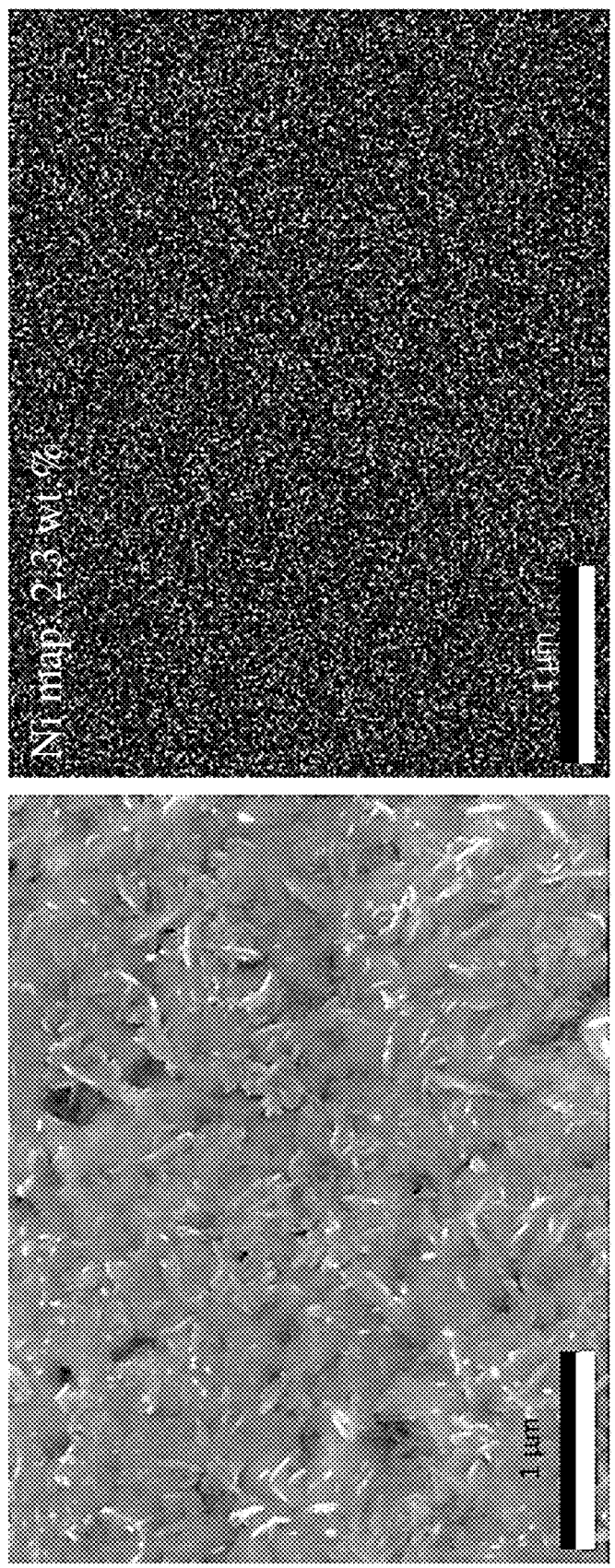
FIG. 4a illustrates a SEM image of the surface of a mixed powder of copper and nickel, together with an energy-dispersive x-ray spectroscopy mapping for nickel distribution thereof.

FIG. 4a shows a SEM image of the surface of a powder particle of the as-mixed Cu+Ni1 powder along with the corresponding energy-dispersive x-ray spectroscopy (EDS) mapping of nickel. In the EDS mapping, black represents copper and white represents nickel.

Figure 4B:
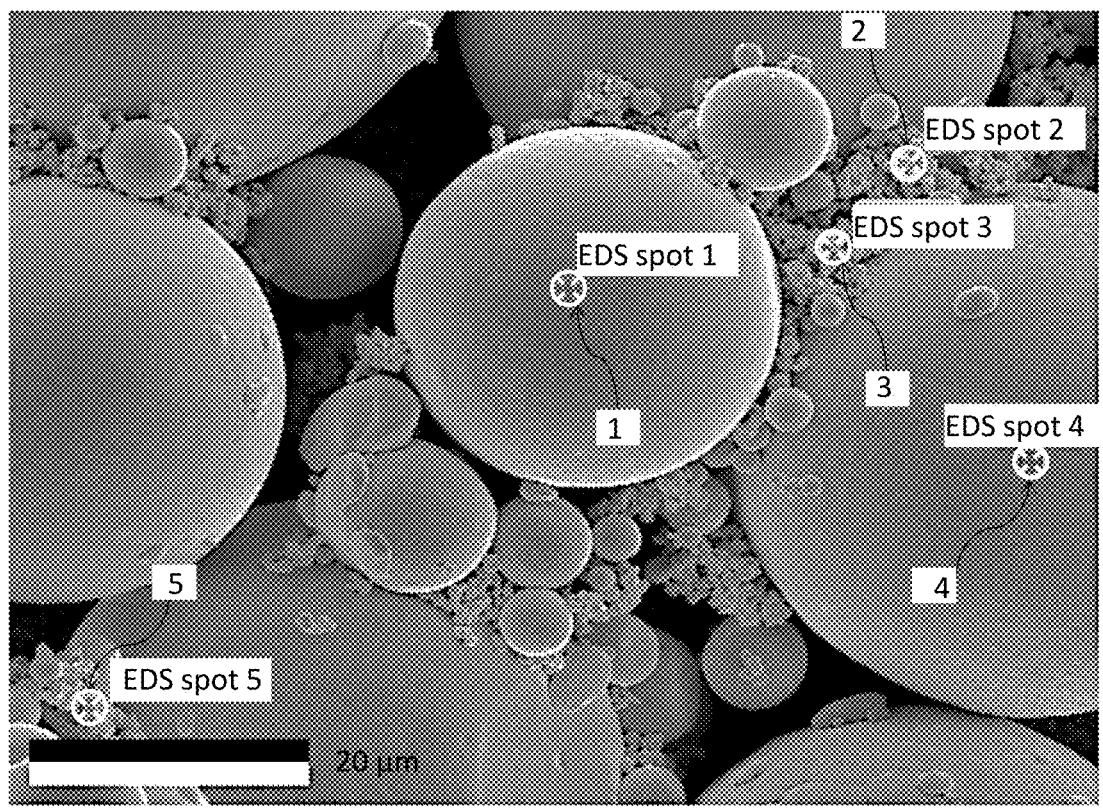
FIG. 4b depicts a SEM image of the mixed copper-nickel powder identifying five locations at which the elemental chemical composition is measured, along with the corresponding measurements.
Figure 5A:
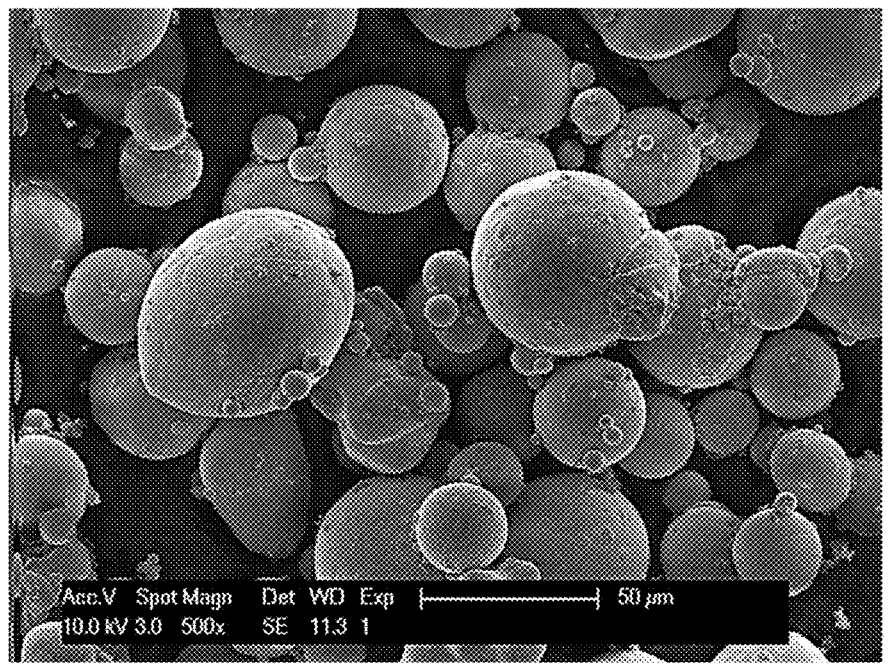
FIG. 5a to 5d illustrate SEM images of the mixed copper-nickel powder after undergoing a surface modification according to embodiments of the present invention.
Figure 5B:
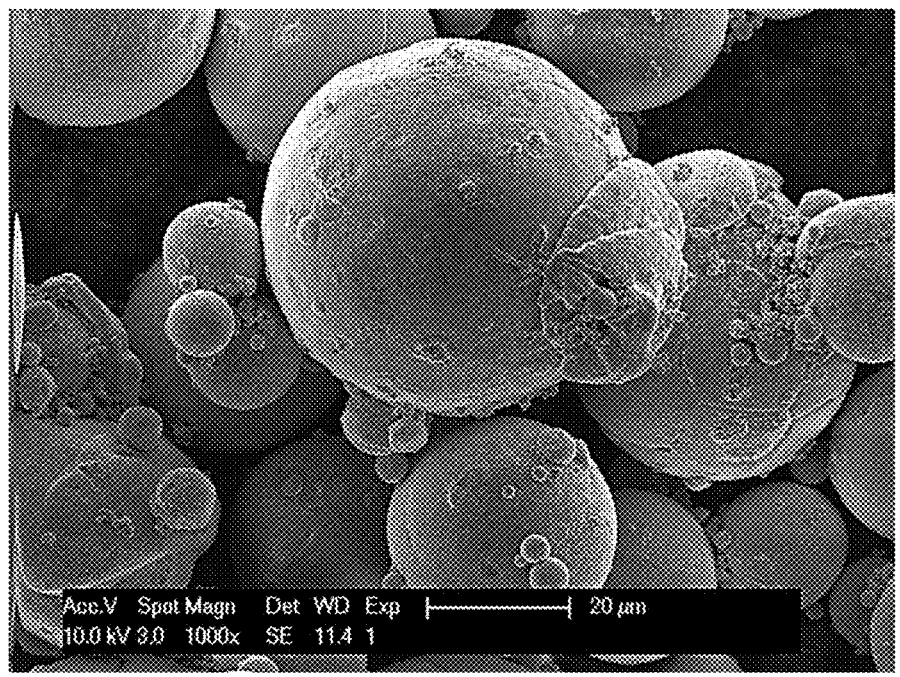
Figure 5C:
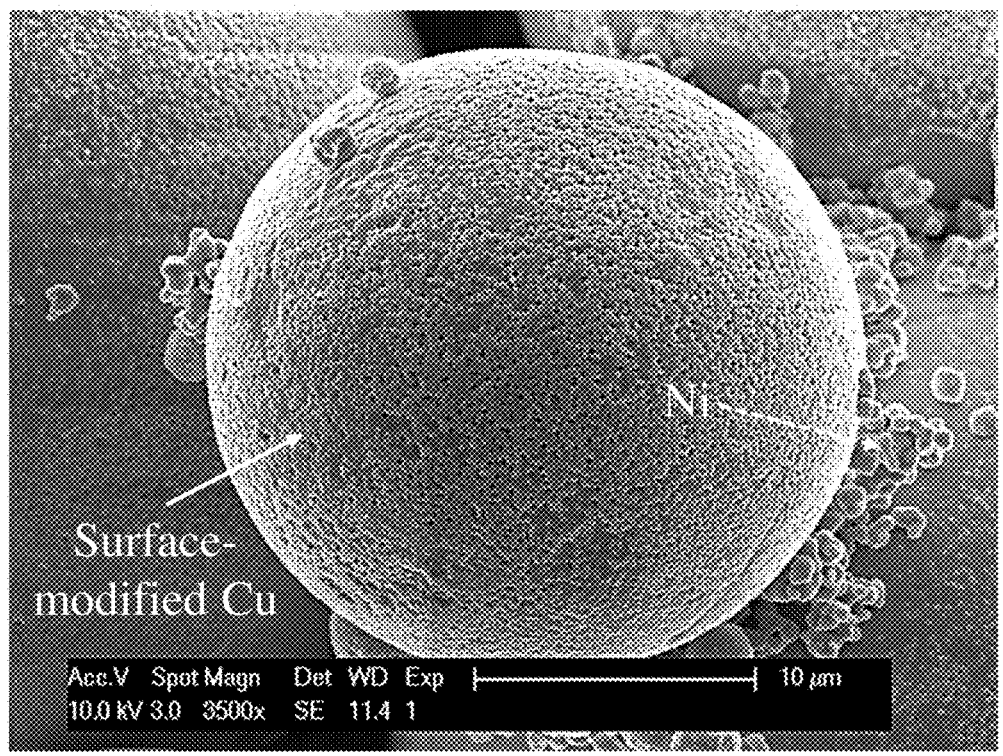
Figure 5D:
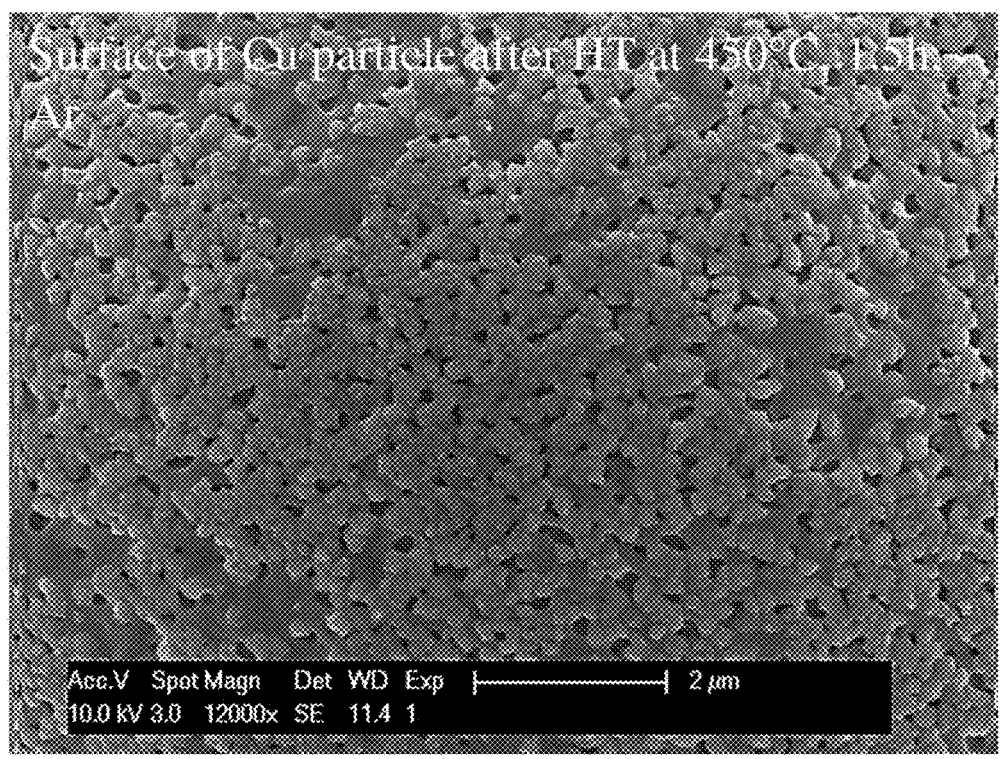

FIG. 4b shows a SEM image of the mixed powder, indicating five measurement locations. The corresponding elemental chemical composition was measured using EDS spectroscopy at these five locations and is indicated in the table. No nickel is measured at the surface of the copper powder particles at points 1 and 4. In the as-mixed state, nickel is mainly present as individual particles.

The mixed powder was placed in a horizontal tube furnace in an atmosphere of hydrogen gas at room temperature. The furnace was brought to a first temperature $T_N$ which took various values for different experiments, at a heating rate of 5° C./min. Once temperature $T_N$ was reached, the hydrogen gas in the furnace was replaced with argon gas. The furnace was maintained at a second temperature $T_N$ equal to the first temperature for varying time periods, as measured from the time of replacing hydrogen with argon gas. That is, in this example the first temperature was always equal to the second temperature. Finally, the furnace was cooled to room temperature and the surface-modified powder was removed from the furnace.

FIGS. 5a to 5d show SEM images of one such heat treated copper-nickel powder with a first temperature (T1) of 450° C. and a second temperature (T2) of 450° C. at which the hold time in step S5 was 1.5 hours. It can be seen that the surface-modified powder particles are coarser and more spherical in shape than the copper powder particles before the heat treatment. The surface of the surface modified copper powder is rough as compared to the surface of copper powder particle in the as-mixed condition. The surface roughness is due to diffusion of nickel in copper which occurs during the heat treatment.

Figure 6:
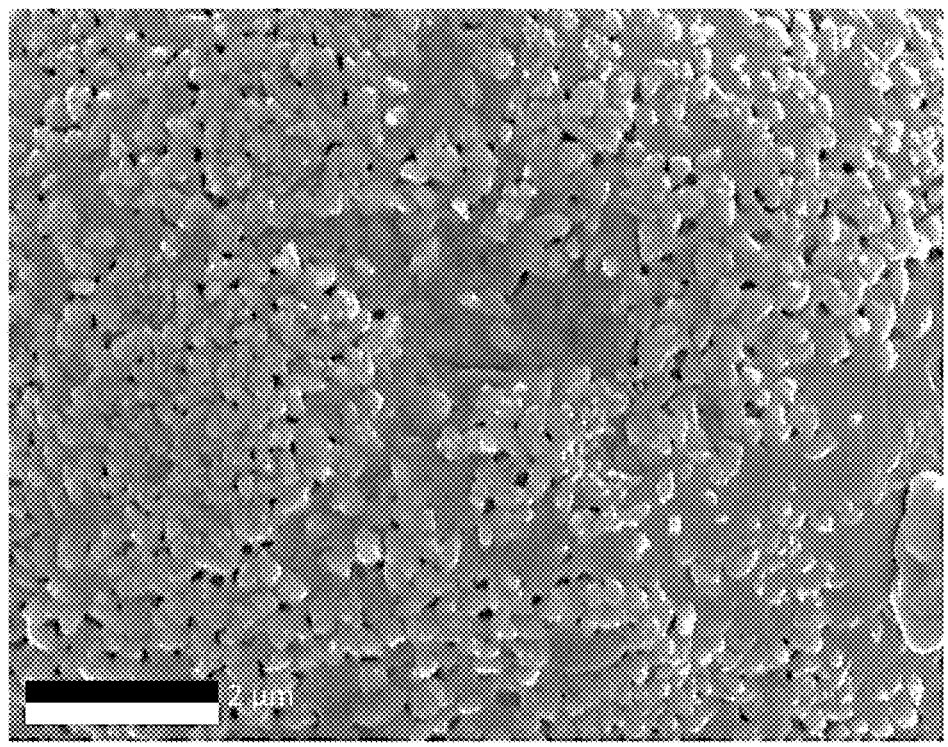
FIG. 6 shows a SEM image of the surface of a powder particle comprised in the powder after a surface modification treatment shown in FIG. 6, along with the corresponding EDS mapping of nickel.
Figure 6:
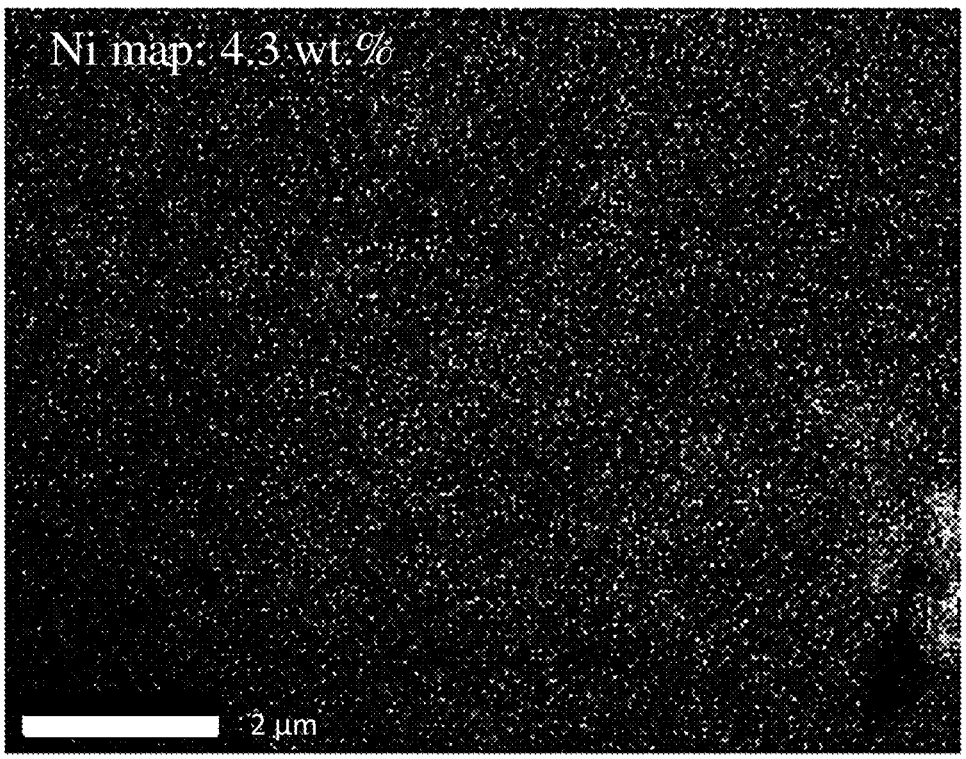

FIG. 6 shows a SEM image of the surface of a powder particle of the same powder shown in FIG. 5, along with the corresponding EDS mapping of nickel. A greater amount of nickel is observed on the surface of the copper powder particle after the heat treatment (4.3 wt. %), as compared to before the heat treatment (FIG. 4b).

Figure 7:
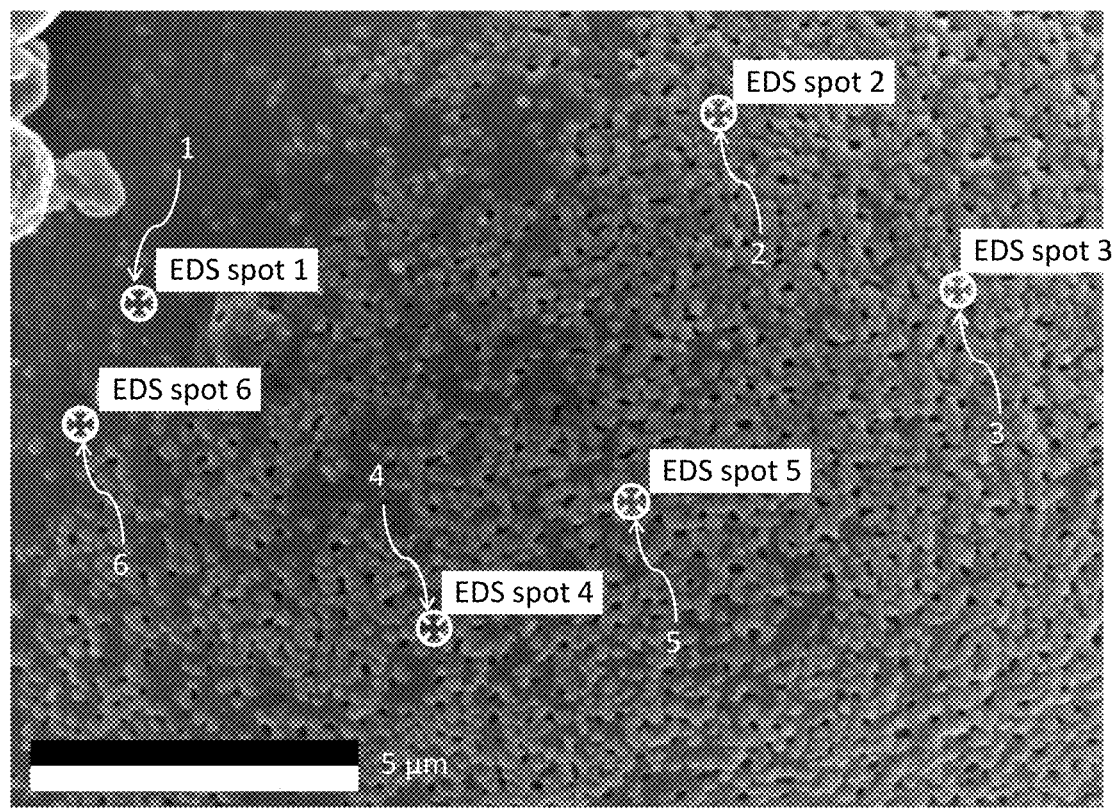
FIG. 7 illustrates a SEM image of the surface of a powder particle comprised in the powder after a surface modification treatment shown in FIG. 6, identifying six locations at which the elemental chemical composition is measured, along with the corresponding measurements.

FIG. 7 shows a SEM image of the surface of a powder particle of the same powder shown in FIG. 5, with six measurement locations indicated. The table shows the corresponding elemental chemical composition measured at the six locations. It can be seen that, in general, higher nickel content is observed on the surface of the surface-modified powder particles as compared to on the surface of the copper powder particles in the as-mixed state (FIG. 4b).

Figure 8:
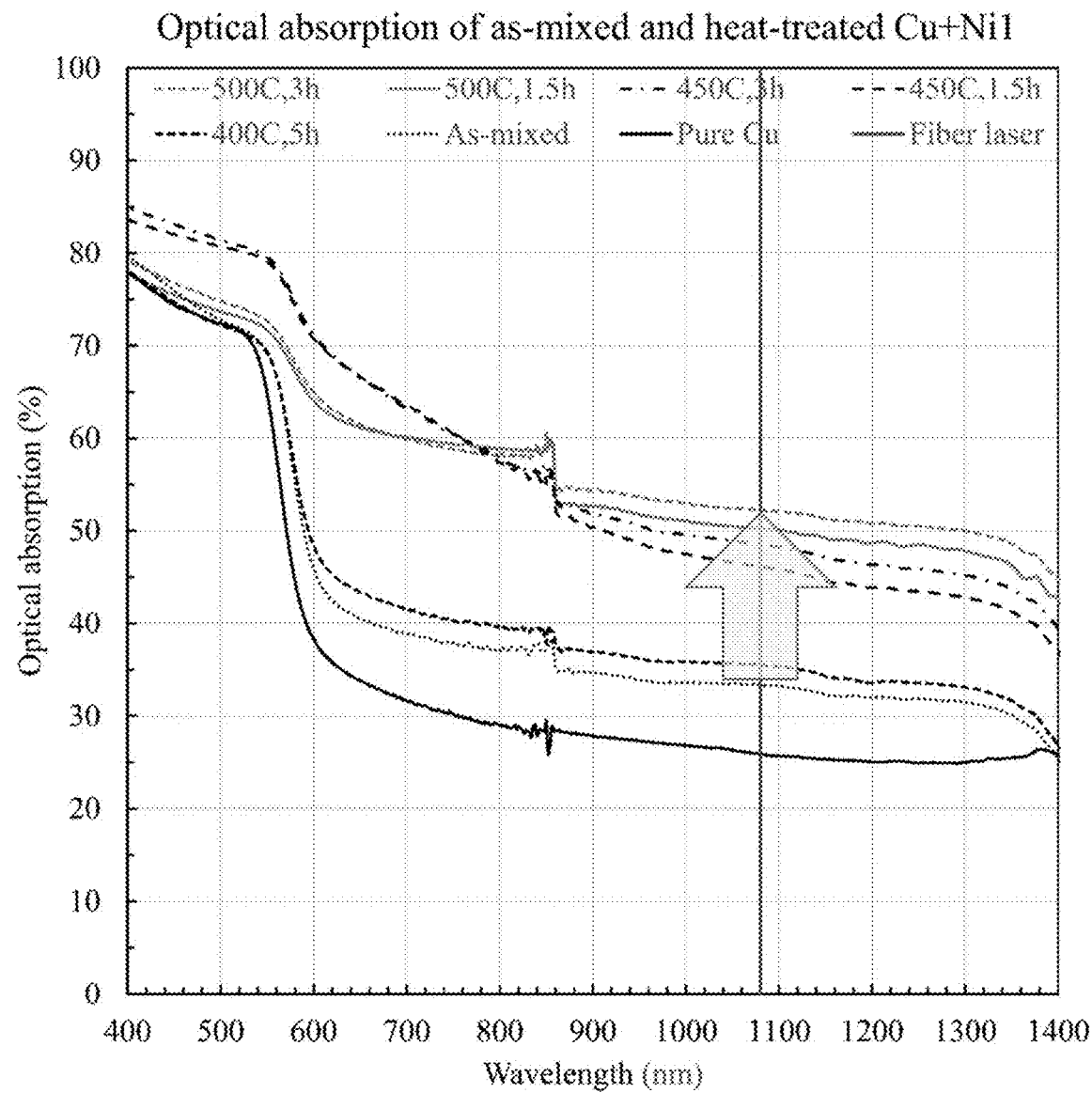
FIG. 8 represents a plot of absorption spectra for various surface-modified powders produced following methods according to embodiments of the present invention.

Referring to FIG. 8, optical absorption characteristics of the resulting copper-nickel powders are shown. The optical absorption was measured using a LAMBDA UV/Vis Spectrophotometer (PerkinElmer), with a deuterium lamp as the light source from 200 to 319 nm and a tungsten lamp as the light source from 319 to 2500 nm. The detectors used were a Photon Counting PMT from 200-860.80 nm and a Lead Sulfide Detector (PbS) from 861-2500 nm.

The data are labelled by temperature $T_1$ and duration of the argon gas stage. The wavelength 1080 nm is also marked, this being a common wavelength used in laser additive manufacturing.

It can be seen that, compared to pure copper powder and the as-mixed powder before heat treatment, all of the powders produced by the heat treatment have an increased optical absorption. The highest absorption above 900 nm is exhibited by the powder treated at 500° C. for three hours, resulting in an absorption of 52% at 1080 nm.

Example 2

Pure copper (99.95%, HCCu) powder with a mean particle size of 45±15 μm was used as the metal powder, obtained from Sandvik Osprey Ltd (United Kingdom). Pure tin powder with a particle size range of 1-5 μm and a mean particle size of 2.5 μm was used as the alloying element powder, obtained from Atlantic Equipment Engineers, a Division of Micron Metals, Inc (US). The powders were dry-mixed in the proportion 99:1 Cu:Sn by weight in a Turbula T2F shaker mixer for 12 hours. During the mixing, the powders were kept inside a polyethylene bottle filled with argon gas to minimize the powder surface oxidation.

Figure 9:
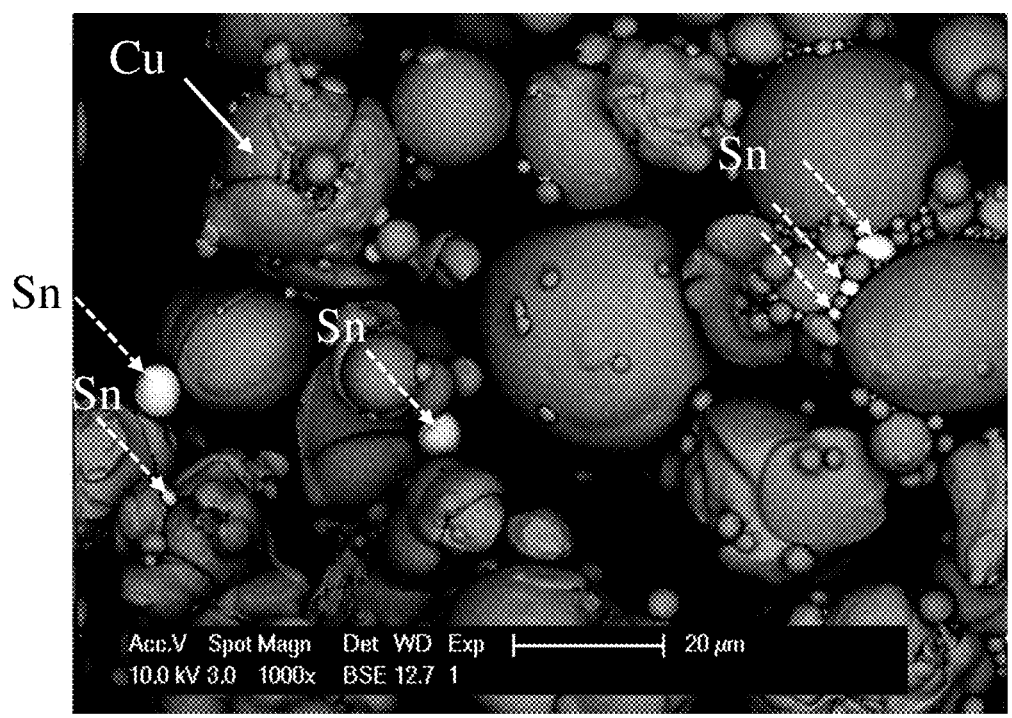
FIG. 9 illustrates backscatter electron images of a mixed powder comprising copper as the metal powder and tin as the alloying element powder.
Figure 9:
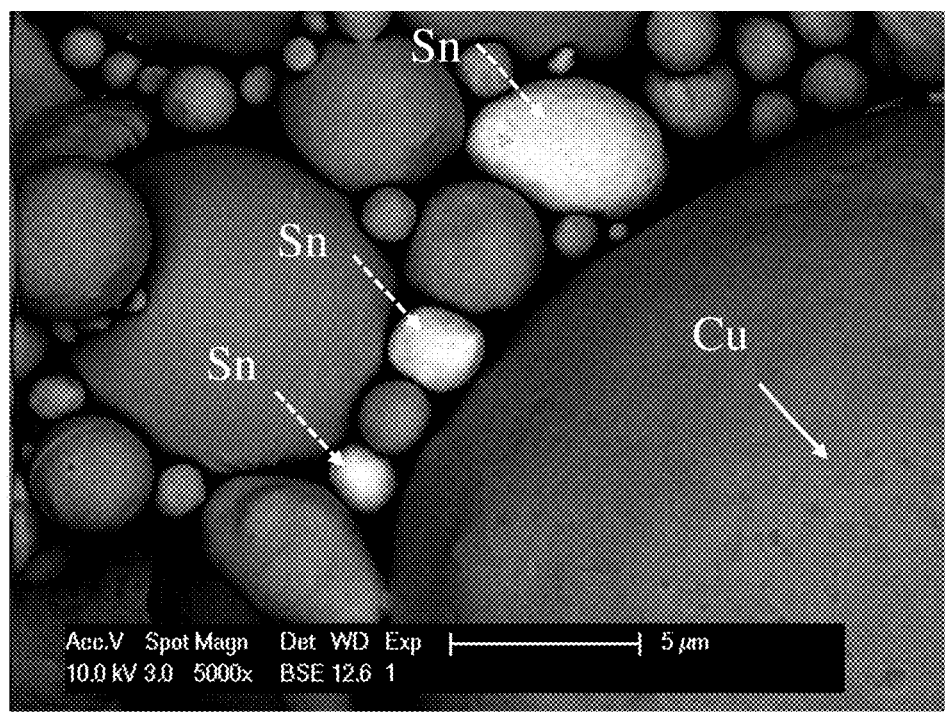

Backscatter electron images of the mixed powder are shown in FIG. 9. Tin powder particles (indicated by dotted arrows) appear brighter; whereas copper powder particles (indicated by solid arrows) appear darker. It can be seen that the tin powder particles are generally more regular in shape than the nickel powder particles used in Example 1.

Two different heat treatments were carried out on separate mixed powders.

Powder A was placed in a horizontal tube furnace in an atmosphere of hydrogen gas at room temperature. The furnace was brought to a first temperature of 200° C. at a heating rate of 5° C./min in a hydrogen atmosphere. Once the temperature reached 200° C., the hydrogen gas in the furnace was replaced with argon gas. The furnace was maintained at a second temperature 200° C. for one hour. Finally, the furnace was cooled to room temperature and the surface-modified powder A was removed from the furnace.

Powder B was placed in a horizontal tube furnace in an atmosphere of hydrogen gas at room temperature. The furnace was brought to a first temperature of 300° C. at a heating rate of 5° C./min in a hydrogen atmosphere. Once the temperature reached 300° C., the hydrogen gas in the furnace was replaced with argon gas. The furnace was maintained at a second temperature 300° C. for one hour. Finally, the furnace was cooled to room temperature and the surface-modified powder B was removed from the furnace.

Figure 10:
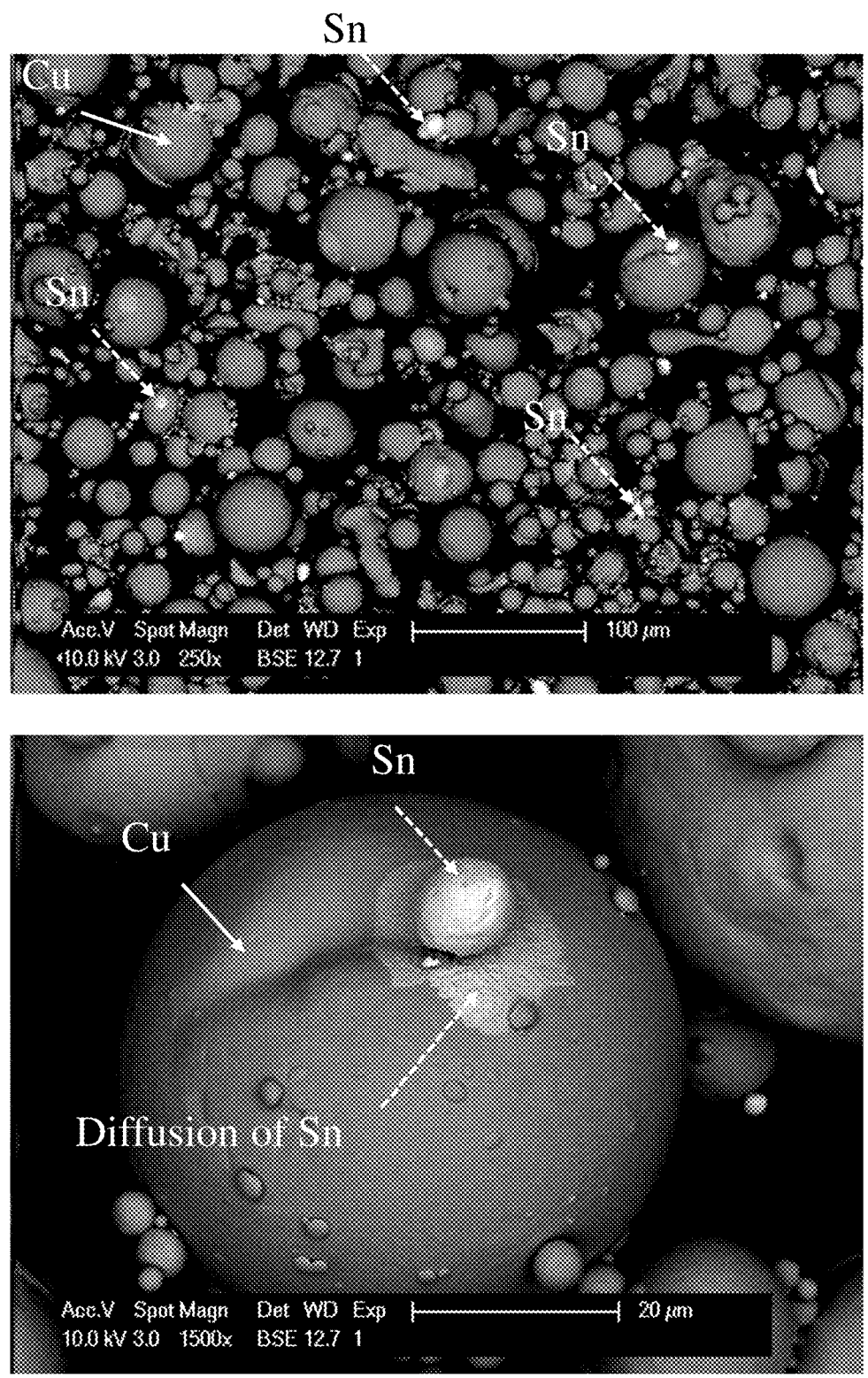
FIG. 10 illustrates backscatter electron images of a copper-tin mixed powder after heat treatment for 1 hour at 200° C. in argon gas.
Figure 11:
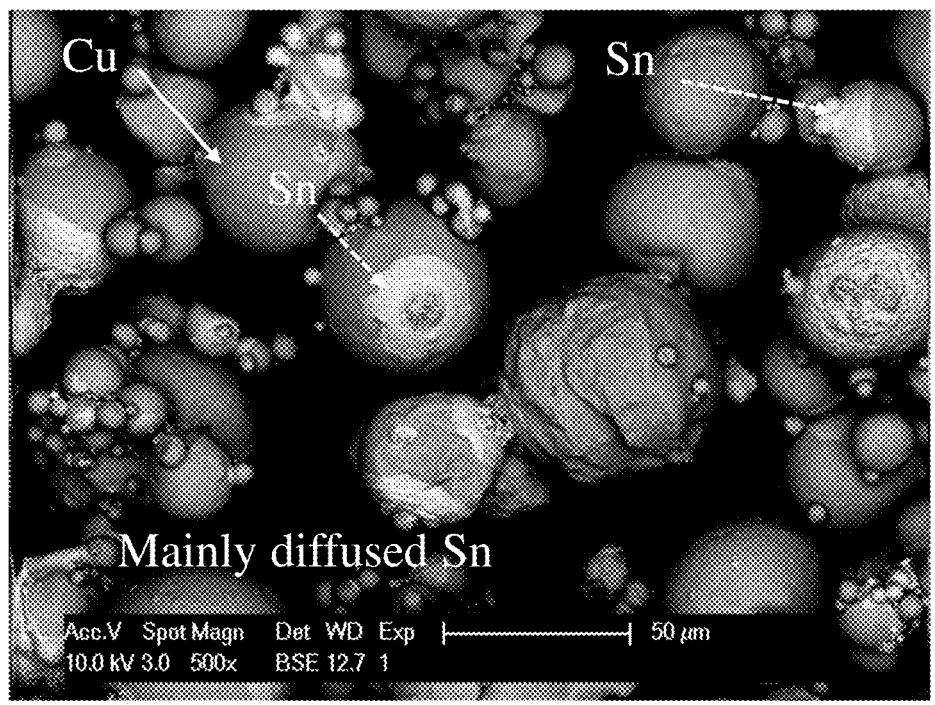
FIG. 11 illustrates backscatter electron images of a copper-tin mixed powder after heat treatment for 1 hour at 300° C. in argon gas.
Figure 11:
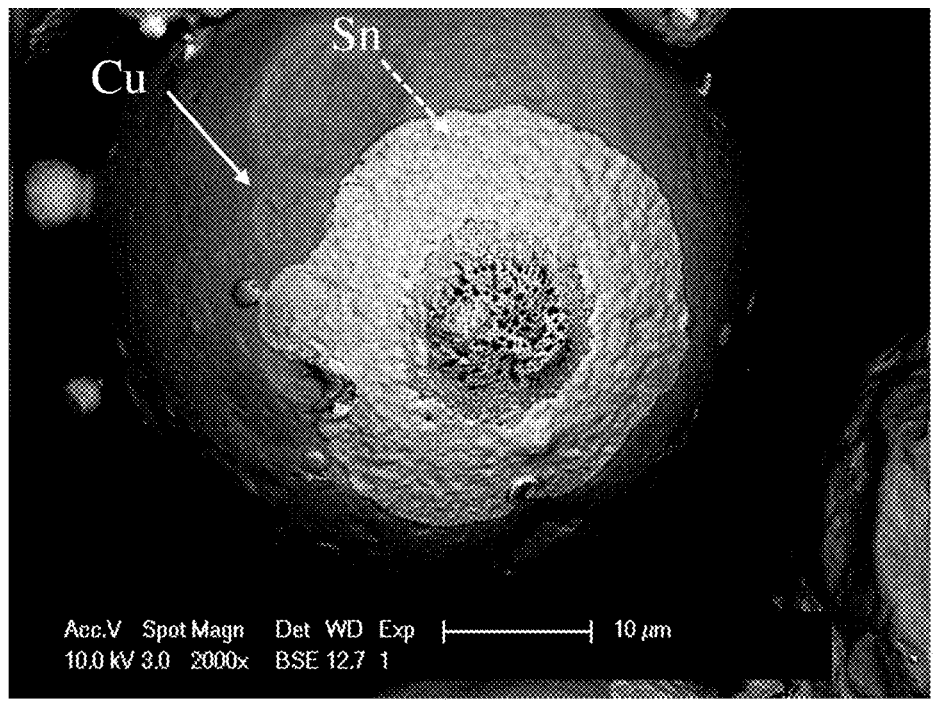

Backscatter electron images of surface-modified powder A are shown in FIG. 10. Partial diffusion of the tin over the surface of copper powder particles can be seen. Backscatter electron images of surface-modified powder B are shown in FIG. 11. It can be seen that most of the tin powder particles melt/diffuse and form a layer of tin on the surface of the copper powder particles. Although in this case the tin can melt, having a melting point of 232° C., as diffusion generally tends to occur at lower temperatures than the melting point it can be assumed that the tin has diffused within the copper as well as melting.

Figure 12:
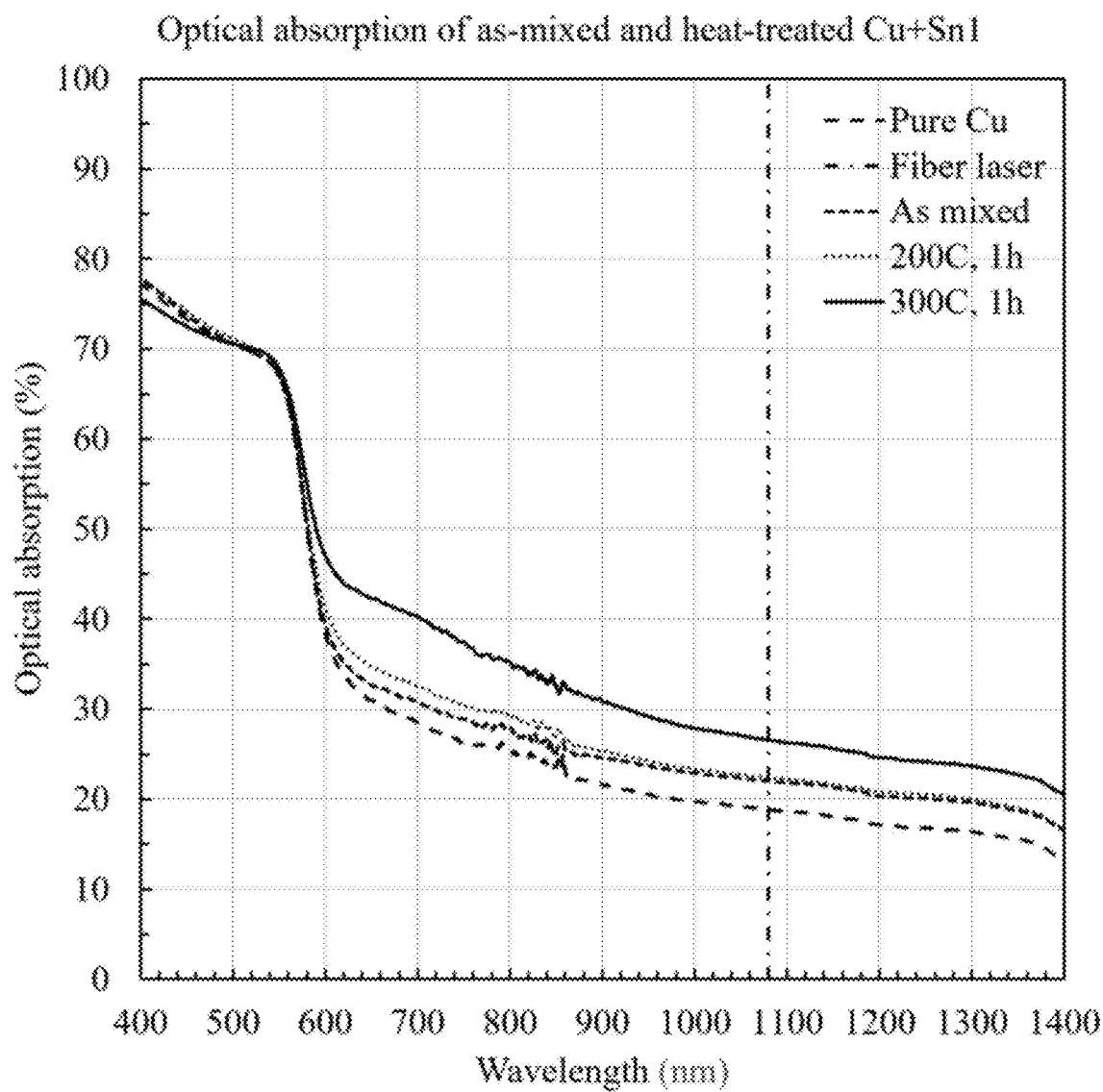
FIG. 12 illustrates a plot of absorption as a function of laser wavelength for a copper-tin mixed powder which has undergone heat treatment according to embodiments of the present invention.

Referring to FIG. 12, it can be seen that both powder A and powder B exhibit an improved optical absorption as compared to the pure copper powder and the mixed powder.

It will be appreciated that the present invention is applicable to a range of metal and alloy element combinations, provided that the alloy element is capable of diffusion in the metal element at a temperature which is less than a temperature at which the metal powder particles would sinter together.

For example, Ni is capable of diffusing in gold and the required temperature for a diffusion distance of no more than 5000 nm is 450° C., which is less than the temperature of 700° C. above which the gold powder particles would sinter together.

Similarly, Sn is capable of diffusing in silver and the required temperature for a diffusion distance of no more than 5000 nm is 200° C., which is less than the temperature of 700° C. above which the silver powder particles would sinter together.

After step S5, a surface-modified powder may be mixed, for example in a multidirectional, low-energy turbula mixer. This can help to break up any clumps or agglomerates of powder which may form during the heat treatment process at the second temperature T2.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of surface modification of a metal or metal alloy powder comprising:
   i) providing a metal or metal alloy powder, the metal or metal alloy powder particles comprising copper, gold, or silver and having an average diameter in the micrometer range,
   ii) providing a powder comprising an alloying element to form an alloying element powder, the alloying element powder particles having an average diameter being less than 10 micrometer and no more than half the average diameter of the metal or metal alloy powder particles;
   iii) mixing the metal or metal alloy powder and the alloy powder to form a mixed powder;
   iv) heating the mixed powder in an atmosphere of oxidation preventing gas comprising a reducing gas or a mixture of a reducing gas and an inert gas to a predetermined first temperature T1;

v) after temperature T1 is reached, replacing the oxidation preventing gas atmosphere with an inert gas atmosphere and maintaining the temperature at a second temperature T2 for a predetermined time, said second temperature T2 being at least equal to said temperature T1, wherein the alloying element is capable of diffusing in the metal or metal alloy element at the second temperature T2.

2. The method according to claim 1, wherein the oxidation preventing gas comprises carbon.

3. The method according to claim 1, wherein the oxidation preventing gas comprises hydrogen.

4. The method according to claim 3, further comprising placing the mixed powder in an atmosphere of argon before step (iv).

5. The method according to claim 1, further comprising, after step (v), a separation step comprising mixing the surface-modified powder in a turbula mixer.

6. The method according to claim 1, wherein the predetermined second temperature T2 is chosen so as to result in a diffusion depth of the alloy element in the metal or metal alloy of no more than 5000 nm.

7. The method according to claim 1, wherein the predetermined second temperature T2 is less than 90% of the melting point of the metal or metal alloy.

8. The method according to claim 1, wherein the alloying element of the alloy element powder and the alloying element of the metal alloy powder, if present, comprises less than 5 wt % of the mixed powder.

9. The method according to claim 1, wherein the predetermined second temperature T2 is chosen so as to achieve an average surface-modified layer thickness of less than 50 nm.

10. The method according to claim 1, wherein the predetermined second temperature T2 is chosen so as to achieve an average surface-modified layer thickness which is greater than the penetration depth of light in the surface-modified powder at a predetermined wavelength.

* * * * *